(12) United States Patent
Wataru et al.

(10) Patent No.: US 6,617,076 B2
(45) Date of Patent: Sep. 9, 2003

(54) SEPARATOR FOR NONAQUEOUS SECONDARY BATTERY AND NONAQUEOUS SECONDARY BATTERY USING THE SAME

(75) Inventors: Yukihiro Wataru, Kyoto (JP); Takashi Aoki, Kyoto (JP)

(73) Assignees: Japan Storage Battery Co., Ltd., Kyoto (JP); GS-Melcotec Co., Ltd., Kyoto (JP)

( * ) Notice: Subject to any disclaimer, the term of this patent is extended or adjusted under 35 U.S.C. 154(b) by 0 days.

(21) Appl. No.: 09/820,969

(22) Filed: Mar. 30, 2001

(65) Prior Publication Data

US 2001/0036580 A1 Nov. 1, 2001

(30) Foreign Application Priority Data

Mar. 30, 2000 (JP) .................................. P.2000-093543

(51) Int. Cl.[7] .................................................. H01M 2/16
(52) U.S. Cl. .................... 429/250; 429/247; 429/248; 429/249; 429/129; 429/133; 429/141
(58) Field of Search .................................. 429/250, 247, 429/248, 249, 129, 133, 141

(56) References Cited

U.S. PATENT DOCUMENTS

| | | | |
|---|---|---|---|
| 5,853,916 A | * | 12/1998 | Venugopal et al. ......... 429/190 |
| 2001/0005563 A1 | | 6/2001 | Yamamoto et al. |

FOREIGN PATENT DOCUMENTS

| | | |
|---|---|---|
| JP | 53-8670 | 1/1978 |
| JP | 55-105972 | 8/1980 |
| JP | 11-081139 | 3/1999 |
| JP | 2000-21382 | 1/2000 |
| JP | 2000-36296 | 2/2000 |
| JP | 2000-36297 | 2/2000 |

* cited by examiner

Primary Examiner—Patrick Ryan
Assistant Examiner—Angela J. Martin
(74) Attorney, Agent, or Firm—Sughrue Mion, PLLC

(57) ABSTRACT

The present invention provides a nonaqueous secondary battery and a separator to be used therein. The separator comprises a polyolefin membrane containing one or more conjugated polyene compounds provided on the surface thereof. The nonaqueous secondary battery having this arrangement performs improved cycle life characteristics and shelf characteristics at high temperatures.

14 Claims, 2 Drawing Sheets

SEPARATOR FOR NONAQUEOUS SECONDARY BATTERY AND NONAQUEOUS SECONDARY BATTERY USING THE SAME

FIELD OF THE INVENTION

The present invention relates to a separator for nonaqueous secondary battery and a nonaqueous secondary battery using the same.

DESCRIPTION OF THE PRIOR ART

In recent years, as electronic devices such as portable telephone and portable personal computer have attained reduction in size and weight and improvement of performance, they have used batteries having a high energy density and a light weight. A typical battery satisfying these requirements is a nonaqueous secondary battery.

A nonaqueous secondary battery comprises lithium cobalt composite oxide, lithium nickel composite oxide, spinnel type lithium manganese oxide or the like for a positive electrode, and lithium metal, lithium alloy, lithium-intercalation compound having lithium ion occluded in carbon as a host material (the term "host material" as used herein is meant to indicate a material capable of occluding or releasing lithium ion) or the like for a negative electrode. The electrolyte used is lithium salts such as $LiClO_4$ or $LiPF_6$ dissolved in an aprotic organic solvent. The separator used is a material obtained by working a polyolefin material insoluble in an organic solvent and stable to electrolyte and active material into microporous membrane or nonwoven fabric. This nonaqueous secondary battery is advantageous in that it can be charged and discharged at a potential of as extremely high as 4 V (vs. $Li/Li^+$) or more, attaining a high operating voltage.

The recent trend is for more nonaqueous secondary batteries to be used in electronic devices which are used not only in room temperature atmosphere but also in various temperatures, i.e., from low temperature to high temperature. In particular, as the speed of operation of central processing unit has been enhanced, inside of the personal computer comes to hot. As a result, the nonaqueous secondary battery used in note type personal computer has been more often used over an extended period of time at high temperature. Therefore, the characteristics at high temperature have been more important among other characteristics of the nonaqueous secondary battery.

However, the prior art nonaqueous secondary batteries perform extremely excellent characteristics at room temperature but have been obvious to be not necessarily satisfactory with respect to cycle life characteristics or shelf characteristics at high temperature.

SUMMARY OF THE INVENTION

It is therefore an object of the invention to improve the cycle life characteristics and shelf characteristics of non-aqueous secondary batteries at high temperature.

The foregoing object of the present invention will become apparent from the following detailed description and examples.

The separator for nonaqueous secondary battery according to the invention comprises one or more conjugated polyene compounds and a polyolefin. The separator containing conjugated polyene compounds used therein can be confirmed to have improved the characteristics such as the shelf characteristics and the cycle life characteristics at high temperature. This is because the deterioration of the separator due to charging or discharging is inhibited.

The present invention relates to:

1. A separator for nonaqueous secondary battery comprising one or more conjugated polyene compounds and a polyolefin.
2. The separator for nonaqueous secondary battery according to 1., wherein said separator comprises a polyolefin membrane as a frame thereof.
3. The separator for nonaqueous secondary battery according to 2., wherein said polyolefin is a polyethylene.
4. The separator for nonaqueous secondary battery according to 3., wherein said conjugated polyene compound is distributed over the surface of said separator.
5. The separator for nonaqueous secondary battery according to 4., wherein said conjugated polyene compound is distributed over one surface of said separator.
6. A nonaqueous secondary battery comprising a battery case, and an electricity generating element inserted in said battery case, said electricity generating element comprising a positive electrode, a negative electrode and a separator spirally wound and containing a non-aqueous electrolyte, said separator comprising one or more conjugated polyene compounds and a polyolefin.
7. The nonaqueous secondary battery according to 6., wherein said separator comprises a polyolefin membrane as a frame thereof.
8. The nonaqueous secondary battery according to 7., wherein said polyolefin is a polyethylene.
9. The nonaqueous secondary battery according to 8., wherein said conjugated polyene compound is distributed over the surface of said separator.
10. The nonaqueous secondary battery according to 9., wherein said conjugated polyene compound is distributed over one surface of said separator.

BRIEF DESCRIPTION OF THE DRAWINGS

By way of example and to make the description more clear, reference is made to the accompanying drawings in which.

DETAILED DESCRIPTION OF THE INVENTION

Figure 1:
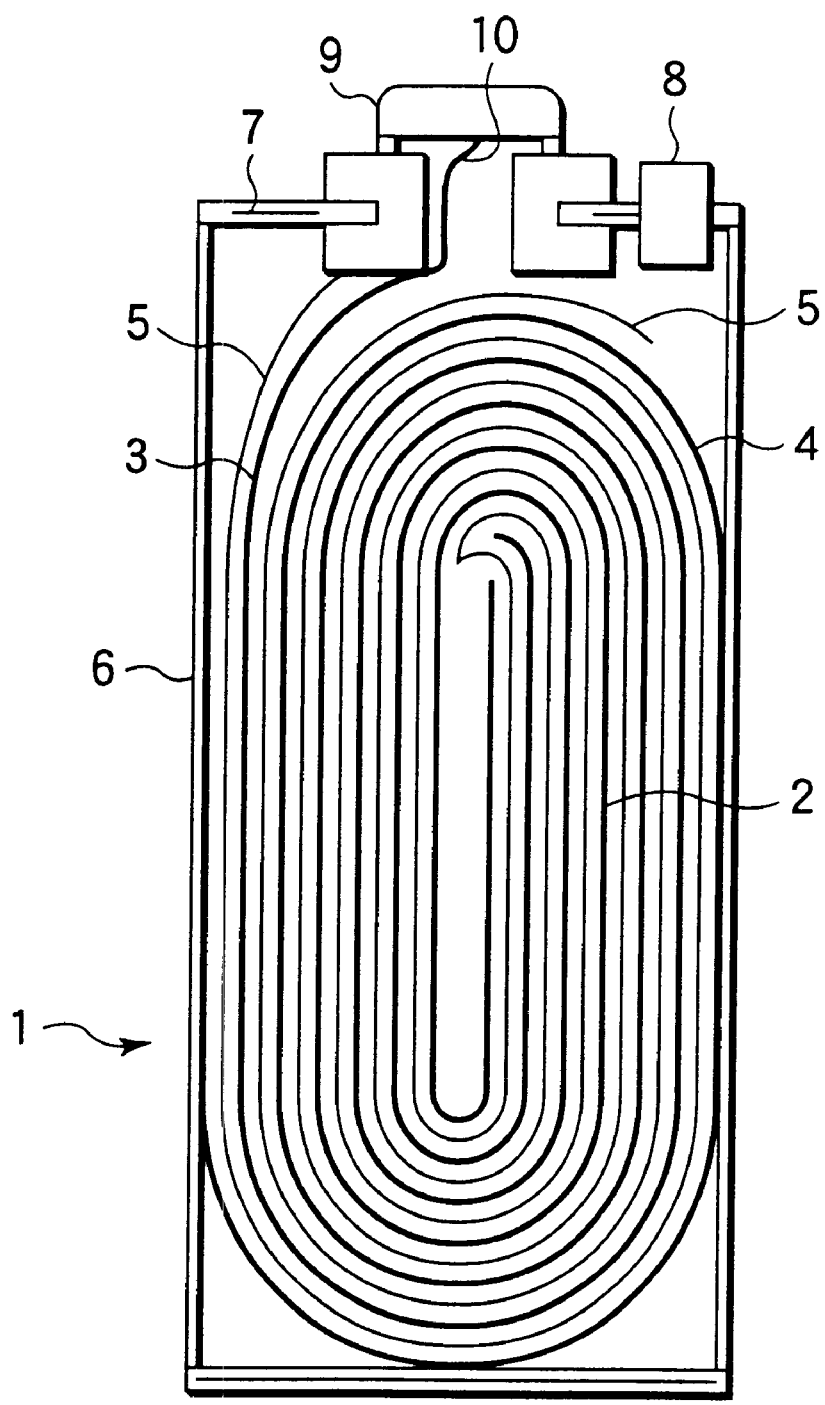
FIG. 1 is a diagram illustrating the sectional structure of a nonaqueous secondary battery of Example 1.

Embodiments of implementation of the invention will be described hereinafter.

The conjugated polyene compound to be used herein is preferably represented by the following molecular formula:

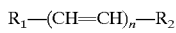

The molecular chain is terminated by hydrogen or alkyl group. One or more conjugated polyene compound may be contained in the separator. These terminals may be the same or different, preferably the same. In case the terminal is hydrogen, the conjugated polyene compound is a polyacetylene represented by the following molecular formula. Such a polyacetylene is preferably used, but the suffix n is not specifically limited.

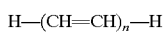

The preparation of the separator comprising conjugated polyene compounds and a polyolefin can be accomplished, e.g., by a process which comprises laminating previously prepared conjugated polyene membrane on a polyolefin-based separator or a process which comprises changing a part of a polyolefin to a conjugated polyene compound by chemical reaction.

Examples of these processes include a process-which comprises sticking a conjugated polyene compound sheet which has previously been formed by a known method (e.g., microporous polyacetylene sheet) to a polyolefin-based microporous separator, and a process which comprises subjecting a polyolefin-based microporous separator to dehydrogenation reaction.

These methods are advantageous in that a conjugated polyene compound is distributed over the surface of the separator. In particular, the separator prepared by the process which comprises changing the surface of a polyolefin-based separator to a conjugated polyene compound can be provided with a continuous polyene structure to advantage. The separator of the invention may contain additives other than conjugated polyene compound and polyolefin.

The separator of the invention comprises conjugated polyene compounds and a polyolefin as mentioned above. In particular, the conjugated polyene compounds are preferably distributed over the surface of the separator, more preferably over one surface of the separator. The separator of the invention preferably comprises a polyolefin membrane as a frame thereof. More preferably, the separator of the invention comprises a conjugated polyene compound formed on the surface of the polyolefin membrane, particularly on the surface of the polyethylene membrane.

The polyolefin to be used herein is not specifically limited. For example, polyethylene, polypropylene, etc. may be used. The separator may be a laminate of polyethylene and polypropylene or may comprise a polypropylene-based membrane containing a polyethylene dispersed therein. The thickness, porosity and pore size of the separator are not specifically limited.

Taking into account shut-down characteristics, in case the battery is generated heat due to external short-circuit, the polyolefin is preferably a polyethylene. Shut-down characteristics mean that by heat closing the micropores of the separator, the electric circuit is interrupted. The polyethylene to be used herein is not specifically limited. Any polyethylenes such as various high density, middle density and low density branched, linear, high molecular and ultrahigh molecular polyethylenes may be used. The polyethylene may comprise various additives such as plasticizer, oxidation inhibitor and fire retardant used therein in a proper amount as necessary.

The amount of the conjugated polyene compounds to be contained in the separator is not specifically limited but preferably a characteristic color (black in color) derived from n-n* transition of double bond in the conjugated polyene compounds can be visually confirmed on the surface of the separator.

In order to prepare the nonaqueous secondary battery according to the invention, an ordinary method may be used with the separator prepared according to the foregoing method. Preferably, as the separator there is used one containing a conjugated polyene compound formed on one side thereof, and the separator is disposed with its conjugated polyene compound side thereof facing the positive electrode. In this arrangement, the surface of the separator which is colored (with the conjugated polyene compound) faces the positive electrode while the uncolored surface thereof faces the negative electrode.

The positive electrode is formed by a positive active material. The positive active material to be used herein is not specifically limited if it is used for secondary lithium battery. For example, the host materials such as composite oxide represented by the composition formula $Li_xMO_2$ or $Li_yM_2O_4$ (in which M represents a transition metal, x represents a number of from 0 to 1, both inclusive, and y represents a number of from 0 to 2, both inclusive), oxide having tunnel structure and lamellar metal chalcogenide may be used. Specific examples of these compounds include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$, and $TiS_2$. Alternatively, an organic compound such as conducting polymer (e.g., polyaniline) may be used. These compounds may be used in admixture. In the case a particulate active material is used, a mixture comprising a particulate active material, a conductive additive and a binder can be formed on a collector made of a metal such as aluminum to prepare a positive electrode.

The negative electrode is formed by a negative active material. As the negative active material, if it is used for in secondary lithium battery, there may be used an alloy of Al, Si, Pb, Sn, Zn, Cd or the like with lithium, transition metal oxide such as $LiFe_2O_3$, $WO_2$ and $MoO_2$, carbonaceous material such as artificial and natural graphite, lithium nitride such as $Li_5(Li_3N)$, lithium metal, or mixture thereof. In the case where a particulate carbonaceous material is used, a mixture comprising a particulate active material and a binder can be formed on a collector made of a metal such as copper to prepare a negative electrode.

As the electrolyte there may be used an inorganic solid electrolyte, polymer solid electrolyte, organic electrolyte or the like. As the solvent for the electrolyte, if it is used for secondary lithium battery, there may be used a polar solvent such as ethylene carbonate, propylene carbonate, dimethyl carbonate, diethyl carbonate, γ-butyrolactone, sulfolane, dimethyl sulfoxide, acetonitrile, dimethylformamide, diethylacetamide, 1,2-dimethoxyethane, 1,2-diethoxyethane, tetrahydrofurane, 2-methyltetrahydrofurane, dioxolane and methyl acetate or mixed solvent thereof.

Examples of the lithium salt to be dissolved in the solvent include salts such as $LiPF_6$, $LiClO_4$, $LiBF_4$, $LiAsF_6$, $LiCF_3CO_2$, $LiCF_3SO_3$, $LiN(SO_2CF_3)_2$, $LiN(SO_2CF_2CF_3)_2$, $LiN(COCF_3)_2$ and $LiN(COCF_2CF_3)_2$, and mixture thereof.

The nonaqueous secondary battery according to the invention may be in any form such as cylindrical, elliptical cylinder, prismatic, coin, button and sheet type. Thus, the form of the nonaqueous secondary battery according to the invention is not specifically limited.

The present invention will be further described in the following examples, but the present invention should not be construed as being limited thereto.

EXAMPLE 1

FIG. 1 illustrates the sectional structure of a prismatic nonaqueous secondary battery of Example 1. The prismatic nonaqueous secondary battery 1 of Example 1 is assembled by storing a flat element 2 in a metallic battery case 6 of nickel-plated iron, then injecting an electrolyte into the battery case. The flat element 2 is obtained by spirally winding a positive electrode 3 coated positive mixture on the aluminum collector and a negative electrode 4 coated negative mixture on the copper collector with a separator 5 insulated therebetween. The flat element is prepared in such an arrangement that the black surface of the separator described later comes in contact with the positive electrode. The design-capacity of the battery is 600 mAh.

The battery case 6 sealed with a battery cover 7 by laser-welding. The battery cover 7 is provided with a safety valve 8. To the positive electrode 3 is connected a positive terminal 9 through a positive lead 10. The negative electrode 4 comes in contact with the inner wall of the battery case 6 so that it is electrically connected to the battery case.

The positive mixture was prepared by a process which comprises mixing 90 parts by weight of $LiCoO_2$ as an active material, 5 parts by weight of acetylene black as a conductive additive and 5 parts by weight of a polyvinylidene fluoride as a binder, and then kneading the mixture properly adding N-methyl-2-pyrrolidone to form a slurry. The slurry thus prepared was uniformly coated on an aluminum collector having a thickness of 20 μm, and then dried. Finally pressing the coated sheet by roll press, the positive electrode 3 was completed. The negative mixture was prepared by a process which comprises mixing 90 parts by weight of a carbonaceous material and 10 parts by weight of a polyvinylidene fluoride, and kneading the mixture properly adding N-methyl-2-pyrrolidone to form a slurry. The slurry thus prepared was uniformly coated on the copper collector having a thickness of 10 μm, and then dried. Finally pressing the coated sheet by roll press, the negative electrode 4 was completed.

The electrolyte was 1.0 mol/l $LiPF_6$ dissolved in a 1/1 mixture (by volume) of ethylene carbonate (EC) and diethyl carbonate (DEC).

As the separator there was used one prepared by dehydrogenating the one side of a microporous polyethylene separator having a thickness of 25 μm, a porosity of 40% and a Gurley value of 500 sec/100 cc. Referring to the dehydrogenation, the microporous polyethylene separator was clamped between a lithium metal plate (as a negative plate) and a platinum plate coated $LiCoO_2$ particles on the surface thereof (as a positive plate) in such an arrangement that it comes in contact with the positive electrode on one side thereof and the negative electrode one the other.

The microporous polyethylene separator thus arranged was then immersed in an electrolyte bath filled with the same electrolyte as mentioned above. A constant voltage of 4.3 V from an external power supply was applied between a negative plate comprising a lithium metal and a positive plate comprising a platinum plate coated $LiCO_2$ particles, so that the platinum plate was kept at a high potential. This treatment was carried out for 2 days while ambient temperature was being kept at 80° C. By carrying out the dehydrogenation in this manner, a conjugated polyene compound was produced on one surface of the microporous polyethylene separator. As mentioned above, the dehydrogenation was carried out with the same electrolyte as used in the nonaqueous secondary battery. Accordingly, when the dehydrogenated separator is used in the nonaqueous secondary battery, no impurities produced by dehydrogenation can contaminate into the battery.

Figure 2:
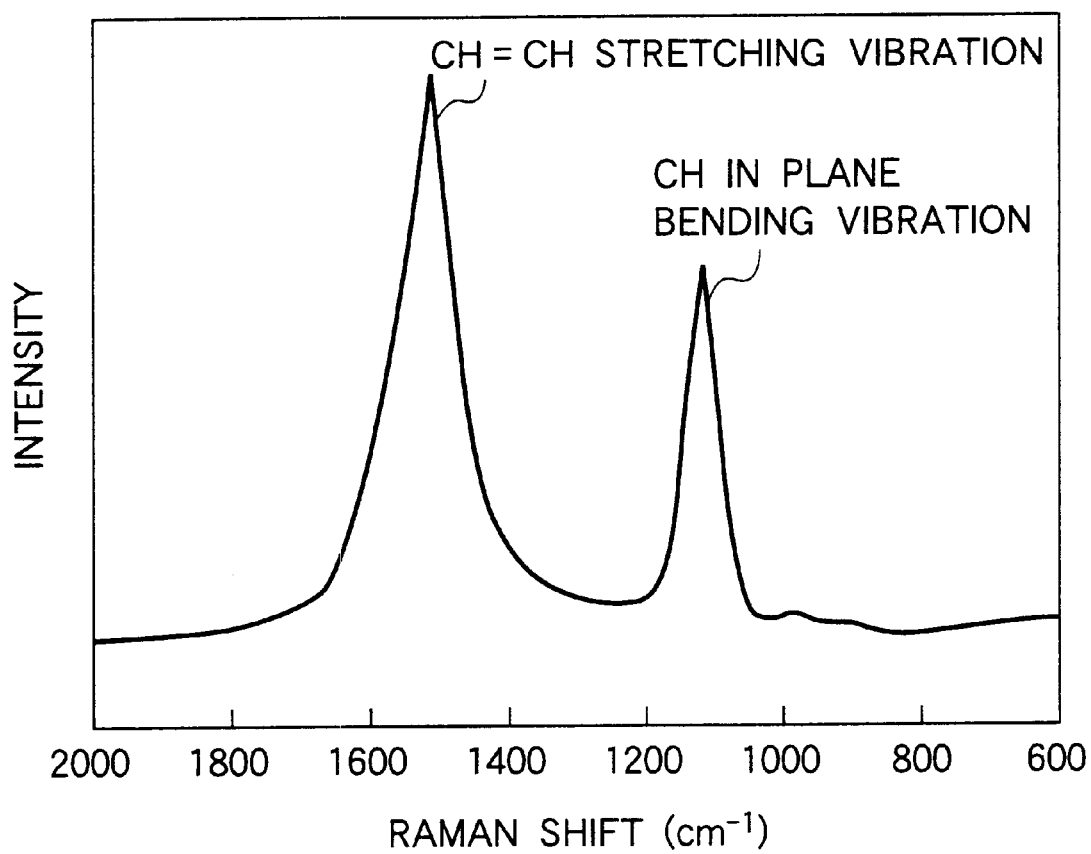
FIG. 2 illustrates the results of Raman spectroscopy of polyacetylene.

The identification of the conjugated polyene compound was carried out by Raman spectroscopy. From the results of Raman spectroscopy shown in FIG. 2, it was confirmed that some of the polyethylene molecules on one surface of the microporous polyethylene separator had been changed to a polyacetylene represented by the following general formula:

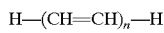

$$H-(CH=CH)_n-H$$

On the surface thereof containing a conjugated polyene compound formed thereon, the microporous polyethylene separator showed black intermixed with white background. The microporous polyethylene separator showed white on the other surface. The microporous polyethylene separator was then cut off. The cross section was then observed. As a result, the black conjugated polyene compound was found to have been distributed down to the depth of about 1 μm from one surface of the separator.

EXAMPLE 2

The same microporous polyethylene separator as used in Example 1 was dehydrogenated in the same manner as in Example 1. The battery of Example 2 was then prepared from the separator thus containing a conjugated polyene compound formed on both surfaces thereof in the same manner as in Example 1.

EXAMPLE 3

The battery of Example 3 was prepared in the same manner as in Example 1 except that the arrangement of the black surface (surface containing a conjugated polyene compound) of the separator was changed so that the black surface faces the negative electrode.

Comparative Example

The battery of comparative example was prepared in the same manner as in Example 1 except that the unhydrogenated microporous polyethylene separator was used.

Comparison Test

Shelf test at high temperature was carried out as mentioned below. In some detail, the batteries of Examples 1 to 3 and the comparative example were each charged with a constant rate of 1 CmA at a constant voltage to 4.2 V for 3 hours. These batteries thus charged were each then stored at a temperature of 60° C. for 30 days. These batteries were each then discharged with a constant rate of 1 CmA. The capacity retention from the initial capacity was then determined. Those showing a capacity retention of 80% or more of the initial capacity were considered good.

Cycle life test at high temperature was carried out as mentioned below. In some detail, the batteries of Examples 1 to 3 and the comparative example were each charged with a constant rate of 1 CmA at a constant voltage to 4.2 V for 3 hours, and then discharged with a constant rate of 1 CmA. This cycle was then repeated. The ratio of the discharge capacity at 300th cycle to that at 1st cycle was then determined. Those showing a capacity retention of 80% or more of the discharge capacity at 1st cycle were considered good.

The results of shelf test and cycle life test at high temperature are shown in Table 1 (Examples 1 to 3 and comparative example).

TABLE 1

| Example No. | Type of polyolefin | Electrode facing the surface containing conjugated polyene compound | Shelf test at high temperature (60° C. × 30 days) | Cycle life test at high temperature (45° C. × 300 cycles) |
|---|---|---|---|---|
| Example 1 | Polyethylene | Positive electrode | 92% | 90% |
| Example 2 | Polyethylene | Both electrodes (positive and negative electrodes) | 88% | 85% |
| Example 3 | Polyethylene | Negative electrode | 85% | 83% |

TABLE 1-continued

| Example No. | Type of polyolefin | Electrode facing the surface containing conjugated polyene compound | Shelf test at high temperature (60° C. × 30 days) | Cycle life test at high temperature (45° C. × 300 cycles) |
|---|---|---|---|---|
| Comparative Example | Polyethylene | — | 70% | 69% |

As can be seen in Examples 1 to 3 of Table 1, the nonaqueous secondary batteries comprising a microporous polyethylene separator containing a conjugated polyene compound perform improved shelf characteristics and cycle life characteristics at high temperature as compared with the battery of comparative example comprising a microporous polyethylene separator free of conjugated polyene compound. As can be seen in the nonaqueous secondary battery of Example 1, this effect becomes remarkable particularly in case of the surface of the separator containing a conjugated polyene compound faces the positive electrode.

While the invention has been described in detail and with reference to specific embodiments thereof, it will be apparent to one skilled in the art that various changes and modifications can be made therein without departing from the spirit and scope thereof.

This application is based on Japanese Patent application No. 2000-093543 filed on Mar. 30, 2000, the entire contents of which are incorporated hereinto by reference.

What is claimed is:

1. A separator for nonaqueous secondary battery, which comprises one or more conjugated polyene compounds and a polyolefin, wherein at least one of said one or more conjugated polyene compounds is represented by formula I,

$$R_1\text{—}(CH\text{=}CH)_n\text{—}R_2 \quad \text{(formula I)}$$

wherein each of $R_1$ and $R_2$ is selected from the group consisting of a hydrogen atom and an alkyl group.

2. The separator for nonaqueous secondary battery according to claim 1, wherein said separator comprises a polyolefin membrane as a frame thereof.

3. The separator for nonaqueous secondary battery according to claim 2, wherein said polyolefin is a polyethylene.

4. The separator for nonaqueous secondary battery according to claim 1, wherein said conjugated polyene compound is distributed over the surface of said separator.

5. The separator for nonaqueous secondary battery according to claim 4, wherein said conjugated polyene compound is distributed over one surface of said separator.

6. A nonaqueous secondary battery, which comprises a battery case, and an electricity generating element inserted in said battery case, said electricity generating element comprising a positive electrode, a negative electrode and a separator spirally wound and containing a nonaqueous electrolyte, said separator comprising one or more conjugated polyene compounds and a polyolefin, wherein at least one of said one or more conjugated polyene compounds is represented by formula I,

$$R_1\text{—}(CH\text{=}CH)_n\text{—}R_2 \quad \text{(formula I)}$$

wherein each of $R_1$ and $R_2$ is selected from the group consisting of a hydrogen atom and an alkyl group.

7. The nonaqueous secondary battery according to claim 6, wherein said separator comprises a polyolefin membrane as a frame thereof.

8. The nonaqueous secondary battery according to claim 7, wherein said polyolefin is a polyethylene.

9. The nonaqueous secondary battery according to claim 6, wherein said conjugated polyene compound is distributed over the surface of said separator.

10. The nonaqueous secondary battery according to claim 9, wherein said conjugated polyene compound is distributed over one surface of said separator.

11. The separator for nonaqueous secondary battery according to claim 4, wherein said conjugated polyene compound is distributed substantially only over the surface of said separator.

12. The separator for nonaqueous secondary battery according to claim 11, wherein said conjugated polyene compound is distributed substantially only over one surface of said separator.

13. The nonaqueous secondary battery according to claim 9, wherein said conjugated polyene compound is distributed substantially only over the surface of said separator.

14. The nonaqueous secondary battery according to claim 13, wherein said conjugated polyene compound is distributed substantially only over one surface of said separator.

* * * * *